April 16, 1963  W. AUBERGER  3,085,745
COUNTER MECHANISM
Filed June 23, 1961

INVENTOR.
WALTER AUBERGER
BY
Richard W. Hanes
ATTORNEY

United States Patent Office 3,085,745
Patented Apr. 16, 1963

3,085,745
COUNTER MECHANISM
Walter Auberger, 2482 Yorktown Road,
Colorado Springs, Colo.
Filed June 23, 1961, Ser. No. 119,129
3 Claims. (Cl. 235—94)

The present invention relates generally to counting devices and more specifically to a direct reading device which counts the number of times the device itself is angularly rotated about its central axis in excess of a given number of degrees.

The apparatus of the invention is directed primarily for use on bottles of liquor at places where the contents of the bottles are dispensed drink by drink, although other uses and advantages of the invention will become apparent as the disclosure progresses. The invention is not limited to the aforesaid primary use and the scope of the invention is limited only by the claims herein contained.

To implement accounting procedures and practices for business and establishments which dispense liquor from a bottle, it is necessary that an inventory of total supply be taken at intervals of time. Accuracy will be preserved only if the stock of partially filled bottles is taken into account along with full unopened bottles. It is thus necessary to determine the quantity remaining, or the quantity used, in a partially filled bottle. Heretofore, this type of inventory has been accomplished by various measuring devices, one of the most widely used of which is a scale especially designed for the purpose and effects a result by determining the weight of the bottle. The scales provide for variables, such as the weight of the bottle, and after calculation, which includes the specific weight of the liquor therein contained, the quantity of liquor remaining in the bottle can be determined.

The scale method and others have certain disadvantages which it is the object of the present invention to overcome. The initial cost of the scales and tables of computation is one disadvantage. Primarily, however, the measuring operation is slow and tedious and is subject to error. In addition, this system has no built-in safeguards against possible dishonesty of employees, such as the practice of diluting the liquor to make up for shortages.

Having briefly surveyed the existing practice of inventorying partially filled bottles, it is the principal object of the present invention to simplify and expedite the process through the use of the inventive counting device.

A second specific object of the invention is to eliminate calculation in determining an inventory by providing a counting device calibrated in measuring units.

A further object of the invention is to provide a device which is attached to each bottle in the inventory stock and which may be sealed thereto to prevent unauthorized tampering with the bottle contents.

A still further and more general object of the present invention is to provide a mechanically simple mechanism for counting the occurrences of rotational displacement of the counting device itself which exceed a predetermined angle.

Another object of the invention is to enable measurements of various types to be made by utilizing the counting device in connection with a start-stop measuring device which operates as a function of angular displacement.

Other and still further objects, features, and advantages of the present invention will become apparent upon a reading of the following detailed description of the invention taken in connection with the drawings.

In brief, the counter of the present invention comprises a base member, or housing, onto which is mounted a ratchet means and a pivotal weight, which weight member carries a pawl which is included in the ratchet means. An indicator is operatively connected to the ratchet means for indicating the count.

The counter mechanism is equipped with an adapter for attachment to any device whose rotational displacements beyond or in excess of a given angle are to be counted. In the accompanying drawings, the counter is shown attached to the pouring spout of a liquid containing bottle in order to count the number of pours made from the bottle, and hence to serve as a measurement of the quantity poured or remaining in the bottle.

Figure 1:
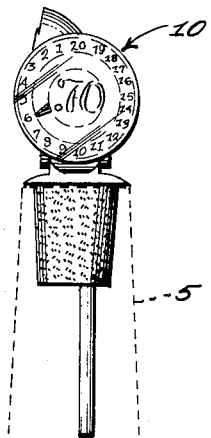
FIGURE 1 is a side view of the counting device, as seen from the scale side, as the device would appear attached to a pouring spout inserted into the neck of a liquid containing bottle. The counter is shown calibrated to measure the number of ounces poured from the bottle.
Figure 2:
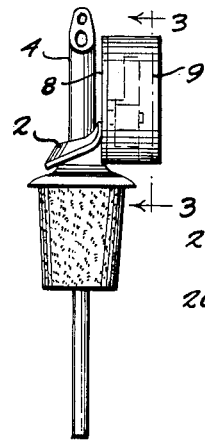
FIGURE 2 is a front view of the measuring device attached to a pouring spout.

Referring now to the drawings for a more detailed description of the present invention, the counter 10 is seen generally in FIGURE 1 with a twenty (20) pour calibration appearing on the front thereof. (The front face of the counter carrying the calibration will also be referred to as the "top" of the housing.) In FIGURE 1 and the other figures, the counter is shown attached by a flexible adapter 2 to the neck of a pouring spout 4 inserted into a liquid containing bottle 5. The adapter 2 is preferably constructed of a tough plastic material and may be secured to the counter housing by cementing, riveting, or other convenient means.

In the preferred embodiment of the counter, as illustrated in the drawings, the counter mechanism is contained in a base member or housing comprising a cylindrical side wall 7 and a substantially flat bottom 8 and top 9. The top 9 carries the calibrations and when the counter is in use the top 9 may appear as the front of the counter.

Mounted at the center of the circular bottom 8 of the housing and rigidly secured thereto is a spindle 11 which extends into the interior of the housing. Rotatably mounted on the spindle 11 is a ratchet wheel 12 which in the preferred embodiment takes the form of a spur gear having radial teeth 14 parallel to its axis and having interdental spaces 16 between the teeth of the gear.

Fastened to the ratchet wheel 12 for rotation therewith and concentrically mounted on the spindle 11 is a throw-out collar 18 which carries an indicator 20 so that the indicator 20 rotates with the ratchet wheel 12.

Disposed in the lateral space between the indicator 20 and the ratchet wheel 12 and partially encircling the spindle and throw-out collar is an arcuate finger 22 made of lead or some other heavy material which will form a weight or counterweight whose purpose will subsequently become clear. The elongated end of the weighted arcuate finger 22 is pinned to the bottom 8 of the housing in a pivotal fashion. The finger is attached to the bottom 8 near its edge so as to be eccentric of the center of the ratchet wheel 12 and the spindle 11.

Figure 3:
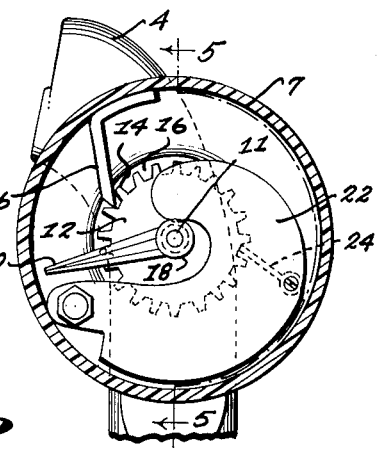
FIGURE 3 is a vertical, cross sectional view of the measuring device taken along section lines 3—3 in FIGURE 2 with the device and measuring spout in an upright position as in FIGURE 1.
Figure 4:
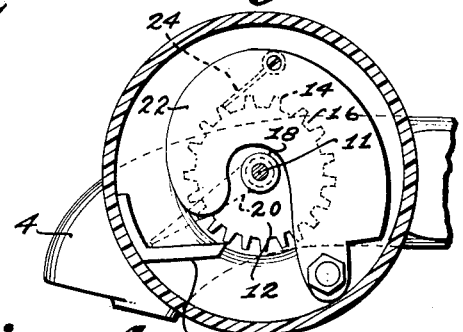
FIGURE 4 is the same view as FIGURE 3 except that the device and measuring spout are shown oriented 90° from the position of FIGURE 3 in a pouring position.
Figure 5:
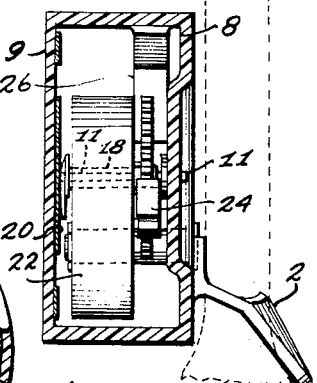
FIGURE 5 is a rear view taken in vertical cross section along lines 5—5 in FIGURE 3. The pouring spout is shown in dotted lines.

To complete the ratchet assembly, or ratchet means, two pawls are provided, one of which will be referred to as a detent for sake of clarity. The pawl 24 is a thin strip of metal fastened along its edge to the bottom of the arcuate finger 22 and positioned so that one of its ends engages at an angle the teeth 14 and interdental spaces 16 of the ratchet wheel 12. The detent 26 may be a thin strip of metal or other material having a substantial amount of rigidity but also some bending flexibility in order that its free end may follow the teeth and interdental spaces of the ratchet wheel 12 as it rotates in one direction (counter-clockwise as seen in FIGURES 3 and 4). The detent is cemented, or otherwise secured, to the side wall 7 of the housing member and protrudes into angular contact with the ratchet wheel as already described.

The operation of the counter relies on the small rotational movement in the arcuate finger 22 about its pivot which occurs when the counter 10 is rotated counter-clockwise about its central axis 11 a given number of degrees. After the counter has passed a certain angle, the weighted arcuate finger moves abruptly from its position of rest, as shown in FIGURE 3, to a new over-center position, as shown in FIGURE 4. The movement of the arcuate finger causes the pawl 24, which is attached to the finger, to advance the ratchet wheel 12 one fraction of a rotation, thus advancing the indicator. As the counter is moved back through its angle of rotation, the detent 26 interferes with any retrograde motion of the ratchet wheel and the indicator remains at its position until subsequent counter-clockwise movements of the counter which will cause the weighted finger to move.

As already pointed out, the use of the device is not limited to counting the number of pours made from a bottle, but it can be employed with any device on which it is desired to count the number of angular excersions about its own axis which the device makes. In the pouring count the face or front of the housing can be calibrated directly in ounces, or other forms of measurement, if the same quantity is poured from the container each time it is tipped.

Figure 6:
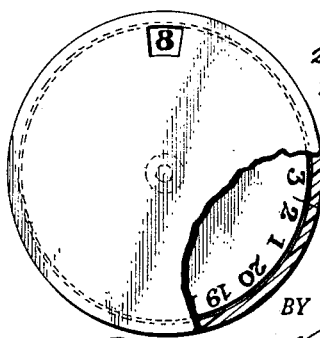
FIGURE 6 is a front view having a broken section show a second embodiment of the indicator means where a disk has replaced the pointer.

In FIGURE 6 is shown a second embodiment of the indicator means wherein the pointer hand 20 has been replaced with a disk 20' having numbers thereon which appear in a cut-out window of the opaque front of the counter housing.

I claim:
1. In a counter for indicating the number of rotational displacements of the counter which exceed a predetermined angle, from its center, the combination comprising: a housing having side walls and a flat bottom and top; a spindle disposed centrally of the bottom of the housing and attached thereto; a spur gear having teeth and interdental spaces mounted for rotation on said spindle and within the housing; an arcuate finger rotatably mounted on the housing bottom eccentric of the center of said spur gear, said arcuate finger partially encircling the center of said spur gear; a pointer concentrically mounted with the spur gear and rigidly attached thereto; a pawl mounted on the arcuate finger and adapted to engage the teeth and interdental spaces of the spur gear; and a detent attached to the housing and positioned for engagement with the teeth and interdental spaces of the spur gear whereby retrograde motion of the spur gear is prevented by interference of the said detent with the spur gear teeth.

2. An angularly displaced counter mechanism comprising in combination: a housing having side walls and a bottom and top; a spindle attached to the housing; gear means having teeth and interdental spaces mounted for rotation on the spindle and within the housing; an arcuate finger rotatably mounted at one of its ends to the said housing; an indicator operatively connected to the gear means and mounted for rotation; a pawl mounted on the arcuate finger and positioned to engage the teeth and interdental spaces of the spur gear; and a detent carried by the housing and adapted for engagement with the teeth and interdental spaces of the spur gear.

3. The counter as set forth in claim 2 wherein the gear means is a spur gear.

References Cited in the file of this patent
UNITED STATES PATENTS

| | | |
|---|---|---|
| 293,089 | Rogers | Feb. 4, 1884 |
| 2,400,328 | Zehring | May 14, 1946 |
| 2,695,751 | Radeloff et al. | Nov. 30, 1954 |